US011940006B2

(12) United States Patent
Hager et al.

(10) Patent No.: US 11,940,006 B2
(45) Date of Patent: Mar. 26, 2024

(54) METHOD FOR CHANGING A SLIDING BEARING ELEMENT OF A ROTOR BEARING OF A WIND TURBINE, AND NACELLE FOR A WIND TURBINE

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 268 days.

(21) Appl. No.: 17/295,243

(22) PCT Filed: Dec. 9, 2019

(86) PCT No.: PCT/AT2019/060421
§ 371 (c)(1),
(2) Date: May 19, 2021

(87) PCT Pub. No.: WO2020/118329
PCT Pub. Date: Jun. 18, 2020

(65) Prior Publication Data
US 2021/0396271 A1   Dec. 23, 2021

(30) Foreign Application Priority Data
Dec. 13, 2018   (AT) ................. A 51111/2018

(51) Int. Cl.
*F03D 80/50* (2016.01)
*F03D 80/70* (2016.01)
*F16C 17/10* (2006.01)

(52) U.S. Cl.
CPC .............. *F16C 17/10* (2013.01); *F03D 80/50* (2016.05); *F03D 80/70* (2016.05);
(Continued)

(58) Field of Classification Search
CPC ...... F03D 80/50; F03D 80/70; F16C 2300/14; F16C 2300/31; F16C 2237/00
See application file for complete search history.

(56) References Cited

U.S. PATENT DOCUMENTS 3,203,260 A    8/1965  Pierry et al.
6,637,942 B2  10/2003  Dourlens et al.
(Continued)

FOREIGN PATENT DOCUMENTS

AT    509 625 B1   10/2011
AT    516029 A4    2/2016
(Continued)

OTHER PUBLICATIONS

International Search Report in PCT/AT2019/060420, dated Mar. 5, 2020.
(Continued)

*Primary Examiner* — Justin D Seabe
(74) *Attorney, Agent, or Firm* — Collard & Roe, P.C.

(57) ABSTRACT

A method changes a sliding bearing element of a rotor bearing of a wind turbine. The rotor bearing includes inner and outer ring elements, between which the sliding bearing element is arranged. The inner ring element and the outer ring element are rotatable relative to each other. A rotor hub is fastened to the inner ring element or to the outer ring element. The sliding bearing element includes multiple individual sliding bearing pads, each of which are releasably fastened to the inner ring element or outer ring element of the rotor bearing by at least one fastener. When changing the sliding bearing element, the individual sliding bearing pads are removed one after the other and replaced by new sliding bearing pads, wherein during the changing of the individual
(Continued)

sliding bearing pads of the sliding bearing element, the inner ring element and the outer ring element are not disassembled.

9 Claims, 3 Drawing Sheets

(52) U.S. Cl.
CPC ...... *F16C 2237/00* (2013.01); *F16C 2300/14* (2013.01); *F16C 2360/31* (2013.01)

(56) References Cited

U.S. PATENT DOCUMENTS

| | | | |
|---|---|---|---|
| 6,866,423 | B2 | 3/2005 | Faltus et al. |
| 7,255,537 | B2 | 8/2007 | Flamang et al. |
| 7,794,151 | B2 | 9/2010 | Neumann |
| 7,832,980 | B2 | 11/2010 | Demtroder et al. |
| 8,545,186 | B2 | 10/2013 | Loeschner et al. |
| 8,591,371 | B2 | 11/2013 | Dinter et al. |
| 8,840,521 | B2 | 9/2014 | Kari et al. |
| 8,974,120 | B2 | 3/2015 | Pedersen et al. |
| 9,057,365 | B2 | 6/2015 | Han et al. |
| 9,206,787 | B2 | 12/2015 | Winkelmann |
| 9,279,413 | B2 | 3/2016 | Ebbesen et al. |
| 9,297,454 | B2 | 3/2016 | Barthel et al. |
| 9,435,376 | B2 | 9/2016 | Gaertner et al. |
| 9,458,880 | B2 | 10/2016 | Kari et al. |
| 9,657,716 | B2 | 5/2017 | Vervoorn et al. |
| 9,677,606 | B2 | 6/2017 | Pischel |
| 9,683,602 | B2 | 6/2017 | Hager et al. |
| 9,784,245 | B2 | 10/2017 | Hager et al. |
| 9,845,826 | B2 | 12/2017 | Sutton et al. |
| 9,869,349 | B2 | 1/2018 | Rittmann et al. |
| 9,995,283 | B2 * | 6/2018 | Stiesdal ................ F16C 17/10 |
| 10,072,704 | B2 | 9/2018 | Sato et al. |
| 10,288,164 | B2 | 5/2019 | Hoelzl |
| 10,436,249 | B2 | 10/2019 | Hoelzl |
| 10,451,176 | B2 | 10/2019 | Hoelzl |
| 10,502,259 | B2 | 12/2019 | Meyer |
| 10,598,214 | B2 | 3/2020 | Hoelzl |
| 10,612,586 | B2 | 4/2020 | Frydendal et al. |
| 10,724,624 | B2 | 7/2020 | Tulokas |
| 11,009,077 | B2 | 5/2021 | Hofmann et al. |
| 11,280,320 | B2 * | 3/2022 | Claramunt Estecha ................ F03D 7/0204 |
| 11,384,728 | B2 * | 7/2022 | Elmose ................ F16C 17/065 |
| 2002/0114549 | A1 | 8/2002 | Hokkirigawa et al. |
| 2003/0063821 | A1 | 4/2003 | Dourlens et al. |
| 2005/0129341 | A1 | 6/2005 | Hoppe |
| 2010/0111459 | A1 | 5/2010 | Yasuda |
| 2011/0254281 | A1 | 10/2011 | Noda et al. |
| 2013/0071246 | A1 | 3/2013 | Kari et al. |
| 2013/0172144 | A1 | 7/2013 | Suzuki et al. |
| 2014/0161614 | A1 | 6/2014 | Vervoorn et al. |
| 2014/0169952 | A1 | 6/2014 | Pedersen et al. |
| 2014/0193262 | A1 | 7/2014 | Pedersen et al. |
| 2014/0193264 | A1 | 7/2014 | Pedersen et al. |
| 2014/0377063 | A1 | 12/2014 | Guerenbourg et al. |
| 2015/0017000 | A1 | 1/2015 | Sato et al. |
| 2015/0055899 | A1 | 2/2015 | Kodama et al. |
| 2015/0159693 | A1 | 6/2015 | Corts |
| 2015/0204383 | A1 | 7/2015 | Ishii et al. |
| 2015/0330498 | A1 | 11/2015 | Carlino et al. |
| 2015/0369284 | A1 | 12/2015 | Hager et al. |
| 2016/0076522 | A1 | 3/2016 | Rohden |
| 2016/0327148 | A1 | 11/2016 | Dinter |
| 2018/0187719 | A1 | 7/2018 | Tulokas |
| 2020/0158090 | A1 | 5/2020 | Hager et al. |
| 2020/0173425 | A1 | 6/2020 | Schroeder |

FOREIGN PATENT DOCUMENTS

| | | | |
|---|---|---|---|
| AT | 519288 | A1 | 5/2018 |
| AT | 15975 | U1 | 10/2018 |
| AU | 650057 | B2 | 3/1992 |
| AU | 2008331343 | A1 | 2/2010 |
| CN | 101438068 | A | 5/2009 |
| CN | 101965455 | A | 2/2011 |
| CN | 102009663 | A | 4/2011 |
| CN | 202082374 | U | 12/2011 |
| CN | 102345676 | A | 2/2012 |
| CN | 102418833 | A | 4/2012 |
| CN | 102713276 | A | 10/2012 |
| CN | 202811230 | U | 3/2013 |
| CN | 103557124 | A | 2/2014 |
| CN | 103765005 | A | 4/2014 |
| CN | 104234949 | A | 12/2014 |
| CN | 104819209 | A | 8/2015 |
| CN | 104956101 | A | 9/2015 |
| CN | 204627877 | U | 9/2015 |
| CN | 106062391 | A | 10/2016 |
| CN | 106164509 | A | 11/2016 |
| CN | 106884972 | A | 6/2017 |
| CN | 108026975 | A1 | 5/2018 |
| CN | 108167442 | A | 6/2018 |
| CN | 108884863 | A | 11/2018 |
| DE | 37 02 008 | A1 | 8/1988 |
| DE | 3726751 | A1 | 2/1989 |
| DE | 10064261 | A1 | 7/2002 |
| DE | 10 2005 001 344 | A1 | 7/2006 |
| DE | 10 2005 018 836 | B3 | 12/2006 |
| DE | 60219261 | T2 | 1/2008 |
| DE | 102011010204 | A1 | 8/2012 |
| DE | 10 2011 119 471 | A1 | 5/2013 |
| DE | 10 2012 212 792 | A1 | 1/2014 |
| DE | 10 2013 211 710 | B3 | 10/2014 |
| DE | 10 2014 205 637 | A1 | 10/2015 |
| DE | 10 2015 201 356 | A1 | 7/2016 |
| DE | 11 2013 003 034 | B4 | 8/2017 |
| DK | 201670106 | A1 | 9/2017 |
| EP | 1 564 406 | A1 | 8/2005 |
| EP | 2 003 334 | A1 | 12/2008 |
| EP | 2 136 093 | A1 | 12/2009 |
| EP | 2290269 | A1 | 3/2011 |
| EP | 2 383 480 | B1 | 10/2012 |
| EP | 2 568 163 | A1 | 3/2013 |
| EP | 2 597 307 | A2 | 5/2013 |
| EP | 2 600 037 | A1 | 6/2013 |
| EP | 2 657 519 | A1 | 10/2013 |
| EP | 2 679 492 | A1 | 1/2014 |
| EP | 2 711 568 | A1 | 3/2014 |
| EP | 2816226 | A1 | 12/2014 |
| EP | 2 863 076 | A1 | 4/2015 |
| EP | 2 955 413 | A1 | 12/2015 |
| EP | 3 012 479 | A1 | 4/2016 |
| EP | 3 040 553 | A1 | 7/2016 |
| EP | 3091242 | A1 | 11/2016 |
| EP | 3 139 034 | A1 | 3/2017 |
| EP | 3 173 642 | A1 | 5/2017 |
| EP | 3 252 306 | A1 | 6/2017 |
| EP | 3 279 471 | A1 | 2/2018 |
| EP | 3 343 071 | A1 | 7/2018 |
| EP | 3 396 187 | A1 | 10/2018 |
| GB | 1405118 | A | 9/1975 |
| GB | 2 201 200 | B | 8/1990 |
| JP | S59-54812 | A | 3/1984 |
| JP | H04-203566 | A | 7/1992 |
| JP | H07-3248 | B2 | 1/1995 |
| JP | H07-293556 | A | 11/1995 |
| JP | H11-303857 | A | 11/1999 |
| JP | 2002-195261 | A1 | 7/2002 |
| JP | 2003176822 | A | 6/2003 |
| JP | 2003194071 | A | 7/2003 |
| JP | 2006-118552 | A | 5/2006 |
| JP | 2010-101263 | A | 5/2010 |
| JP | 2010-151207 | A | 7/2010 |
| JP | 2014-159861 | A | 9/2014 |
| JP | 2015-001279 | A | 1/2015 |
| JP | 2017-048849 | A | 3/2017 |
| KR | 2014-0143620 | A | 12/2014 |
| WO | 2007/071239 | A1 | 6/2007 |
| WO | 2008/152083 | A1 | 12/2008 |
| WO | 2011/127509 | A1 | 10/2011 |

(56) References Cited

FOREIGN PATENT DOCUMENTS

| WO | 2011/127510 A1 | 10/2011 |
| WO | 2012103913 A1 | 8/2012 |
| WO | 2013/191163 A1 | 12/2013 |
| WO | 2014/005587 A1 | 1/2014 |
| WO | 2014/117196 A1 | 8/2014 |
| WO | 2014/173808 A1 | 10/2014 |
| WO | 2017144058 A1 | 8/2017 |
| WO | 2018/071941 A1 | 4/2018 |

OTHER PUBLICATIONS

International Search Report in PCT/AT2019/060424, dated Apr. 3, 2020.
International Search Report in PCT/AT2019/060425, dated Apr. 14, 2020.
International Search Report in PCT/AT2019/060421, dated Apr. 3, 2020.
International Search Report in PCT/AT2019/060426, dated Apr. 7, 2020.
International Search Report in PCT/AT2019/060419, dated Mar. 26, 2020.
Li Yunlong, Discussion on Localization of Composite Material Sliding Bearing in Hydropower Projects, Hongshui River, vol. 35, Issue 2, 4 pages, with English Abstract at the end of the document, Apr. 2016.

\* cited by examiner

METHOD FOR CHANGING A SLIDING BEARING ELEMENT OF A ROTOR BEARING OF A WIND TURBINE, AND NACELLE FOR A WIND TURBINE

CROSS REFERENCE TO RELATED APPLICATIONS

This application is the National Stage of PCT/AT2019/060421 filed on Dec. 9, 2019 which claims priority under 35 U.S.C. § 119 of Austrian Application No. A 51111/2018 filed on Dec. 13, 2018, the disclosure of which is incorporated by reference. The international application under PCT article 21(2) was not published in English.

BACKGROUND OF THE INVENTION

1. Field of the Invention

The invention relates to a method for changing a sliding bearing element of a rotor bearing, as well as a nacelle for a wind turbine.

2. Description of the Related Art

From the prior art, it is known that for changing the rotor bearing, the rotor is removed from the nacelle housing. However, this process is very complex and therefore time-consuming. As during the downtime, no electricity can be generated, the maintenance of the wind turbine should take as little time as possible.

SUMMARY OF THE INVENTION

The object of the present invention was to overcome the disadvantages of the prior art and to provide a method, by means of which the changing of the rotor bearing can take place as simply as possible. Moreover, a nacelle for a wind turbine is to be specified, in which the method can be carried out.

This object is achieved by means of a device and a method according to the claims.

The subject matter of the invention is a method for changing a sliding bearing element of a rotor bearing of a wind turbine. The rotor bearing comprises an inner ring element and an outer ring element, between which the sliding bearing element is arranged. The inner ring element and the outer ring element are rotatable relative to one another. A rotor hub is fastened to the inner ring element or to the outer ring element. Of course, it may also be provided that the inner ring element or the outer ring element are part of the rotor hub or part of the housing. The sliding bearing element comprises multiple individual sliding bearing pads, each of which are releasably fastened to the inner ring element or outer ring element of the rotor bearing by means of at least one fastening means. When changing the sliding bearing element, the individual sliding bearing pads are removed one after the other and replaced by new sliding bearing pads, wherein during the changing of the individual sliding bearing pads of the sliding bearing element, the inner ring element and the outer ring element are not disassembled.

The method according to the invention entails the advantage that changing the sliding bearing elements and thus the maintenance of the wind turbine can take place as simply and quickly as possible. Thereby, the wind turbine can generate energy again after only a short maintenance period.

In particular, the use of individual sliding bearing pads entails the advantage that they can be removed from the wind turbine individually and independently of each other, in order to be able to perform the maintenance without disassembling the rotor and/or rotor hub.

Moreover, it may be useful if in the course of the changing operation, all of the individual sliding bearing pads are changed, wherein for changing the individual sliding bearing pads, a respective sliding bearing pad to be changed is moved into a sliding bearing pad changing position, in which it is not loaded. By moving the sliding bearing pad to be changed into a sliding bearing pad changing position, it can be removed from the wind turbine. For this purpose, the fastening means, by means of which the sliding bearing pad is fastened to the inner ring element or to the outer ring element, has to be released. In the course of this, the sliding bearing pads remaining in the rotor bearing can carry the distributed weight of the rotor hub and/or of the rotor.

Furthermore, it may be provided that both the inner ring element and the outer ring element are designed to be V-shaped, and a first sliding bearing element and a second sliding bearing element, each having multiple individual sliding bearing pads, are arranged between the two ring elements so as to be axially spaced apart from each other, wherein the two sliding bearing elements are arranged at an angle to one another when viewed in the cross-section, wherein due to a tilting torque acting on the rotor hub, one of the two sliding bearing elements is not loaded at its topmost position and the second of the two sliding bearing elements is not loaded at its bottommost position, which results in the sliding bearing pad changing positions. Particularly in the case of a thus structured rotor bearing, the gravity acting on the rotor and/or the rotor hub can be used to easily change the sliding bearing pads.

In addition to this, it may be provided that the rotor hub is fastened to the inner ring element and that the sliding bearing pads of the sliding bearing elements are fastened to the inner ring element and that the first sliding bearing element, which is farther away from the rotor hub, is not loaded at its bottommost position and that the second sliding bearing element, which is closer to the rotor hub, is not loaded at its topmost position and that by rotating the rotor hub, the individual sliding bearing pads of the sliding bearing elements can be moved into the sliding bearing pad changing position. Particularly in a thus designed rotor bearing, the changing operation of the individual sliding bearing pads is easily possible.

As an alternative to this, it may be provided that the rotor hub is fastened to the outer ring element and that the sliding bearing pads of the sliding bearing elements are fastened to the outer ring element and that the first sliding bearing element, which is farther away from the rotor hub, is not loaded at its topmost position and that the second sliding bearing element, which is closer to the rotor hub, is not loaded at its bottommost position and that by rotating the rotor hub, the individual sliding bearing pads of the sliding bearing elements can be moved into the sliding bearing pad changing position. Particularly in a thus designed rotor bearing, the changing operation of the individual sliding bearing pads is easily possible.

A design according to which it may be provided that at least one of the sliding bearing pads remains in the rotor bearing at any point in time during the changing of the sliding bearing element is also advantageous. This allows supporting the rotor hub and/or the rotor at any point in time.

According to an advancement, it is possible that the method comprises the following method steps:

rotating the rotor hub relative to a nacelle housing of the nacelle until one of the sliding bearing pads arrives at a sliding bearing pad changing position at which it is not loaded;

removing that sliding bearing pad which is situated at the sliding bearing pad changing position and inserting a new sliding bearing pad in place of the removed sliding bearing pad;

rotating the rotor hub relative to the nacelle housing of the nacelle until a further one of the sliding bearing pads arrives at the sliding bearing pad changing position;

removing that sliding bearing pad which is situated at the sliding bearing pad changing position and inserting a new sliding bearing pad in place of the removed sliding bearing pad;

performing the above method steps until all of the old sliding bearing pads are replaced by new sliding bearing pads. Particularly the sequence of these method steps leads to the simplest possible changing of the sliding bearing pads.

Furthermore, it may be useful if the rotor hub is received by means of a receiving device and the rotor hub is subjected to such a force by means of the receiving device that, in each case, the sliding bearing pad to be changed is relieved. The weight force of the rotor, in particular of the rotor hub and of the rotor blades, can be carried by the receiving device, whereby changing the sliding bearing pads can be made easier. In particular, it is possible to actively influence the position of the sliding bearing pad changing position.

In addition to this, it may be provided that while being changed, the sliding bearing pads are moved in a changing direction in parallel to their sliding surface. In particular, it may be provided that the sliding bearing pads are pulled out of their operating position in parallel to their sliding surface. This entails the advantage that the two ring elements do not have to be removed from each other for the removal of the sliding bearing pads, but the sliding bearing pads can be easily pulled out of their position between the two ring elements. In the case of V-shaped ring elements, the sliding bearing pads can be pulled out of their operating position in a diagonal direction. In the case of sliding bearing elements, which are designed as axial bearings, the sliding bearing pads can be pulled out of their operating position in a radial direction. In the case of sliding bearing pads elements, which are designed as radial bearings, the sliding bearing pads can be pulled out of their operating position in an axial direction.

Moreover, it may be provided that before removing the sliding bearing pads, the lubricating oil in the lubricating oil sump is discharged. Thereby, the accessibility of the sliding bearing pad across their entire circumference can be achieved.

According to the invention, a nacelle for a wind turbine is provided. The nacelle comprises:
a nacelle housing;
a rotor hub;
a rotor bearing for bearing the rotor hub on the nacelle housing, wherein the rotor bearing has at least one inner ring element and at least one outer ring element, wherein at least one sliding bearing element is formed between the inner ring element and the outer ring element. The sliding bearing element comprises multiple individual sliding bearing pads, which are arranged so as to be distributed over the circumference. Each of the sliding bearing pads is fastened, by means of at least one fastening means, to that ring element which is designed to be rotatable relative to the nacelle housing. The changing of the sliding bearing according to the invention is made possible in such a structure.

According to a particular design, a sliding bearing pad changing opening, through which the sliding bearing pads can be guided, may be arranged in the nacelle housing. This entails the advantage that the individual sliding bearing pads can be easily changed.

Moreover, it may be provided that internal threads are formed in the individual sliding bearing pads, which internal threads cooperate with the fastening means, in particular with screws.

Alternatively thereto, it may be provided that fastening inserts, in particular threaded inserts, are received in the individual sliding bearing pads, which fastening inserts cooperate with the fastening means, in particular with screws.

In particular, it may be provided that the internal threads and/or the fastening inserts are formed and/or received in blind holes.

The inner ring element and the outer ring element not being disassembled while changing the individual sliding bearing pads of the sliding bearing element in particular means that the two ring elements are not moved away from each other farther than 300 mm, in particular not farther than 100 mm, preferably not farther than 5 mm, out of their operating position. In particular, it may be provided, however, that the inner ring element or the outer ring element is rotated and/or slightly lifted and/or tilted and the bearing load is taken off the individual respective sliding bearing pads to be changed. In other words, it may be provided that during the changing operation, a rotor hub is not removed from the nacelle housing of the nacelle.

In addition to a nacelle housing, a nacelle within the meaning of this document also comprises a rotor hub and a rotor bearing for bearing the rotor hub.

The inner ring element and/or the outer ring element can each be formed as independent components, which may be coupled with the rotor hub or rotor shaft and/or with the nacelle housing. In the alternative to this, it is also conceivable that the inner ring element is formed as an integral element of the rotor hub and/or the rotor shaft. In the alternative to this, it is also conceivable that the outer ring element is formed as an integral element of the rotor hub and/or the rotor shaft. In the alternative to this, it is also conceivable that the inner ring element is formed as an integral element of the nacelle housing. In the alternative to this, it is also conceivable that the outer ring element is formed as an integral element of the nacelle housing.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
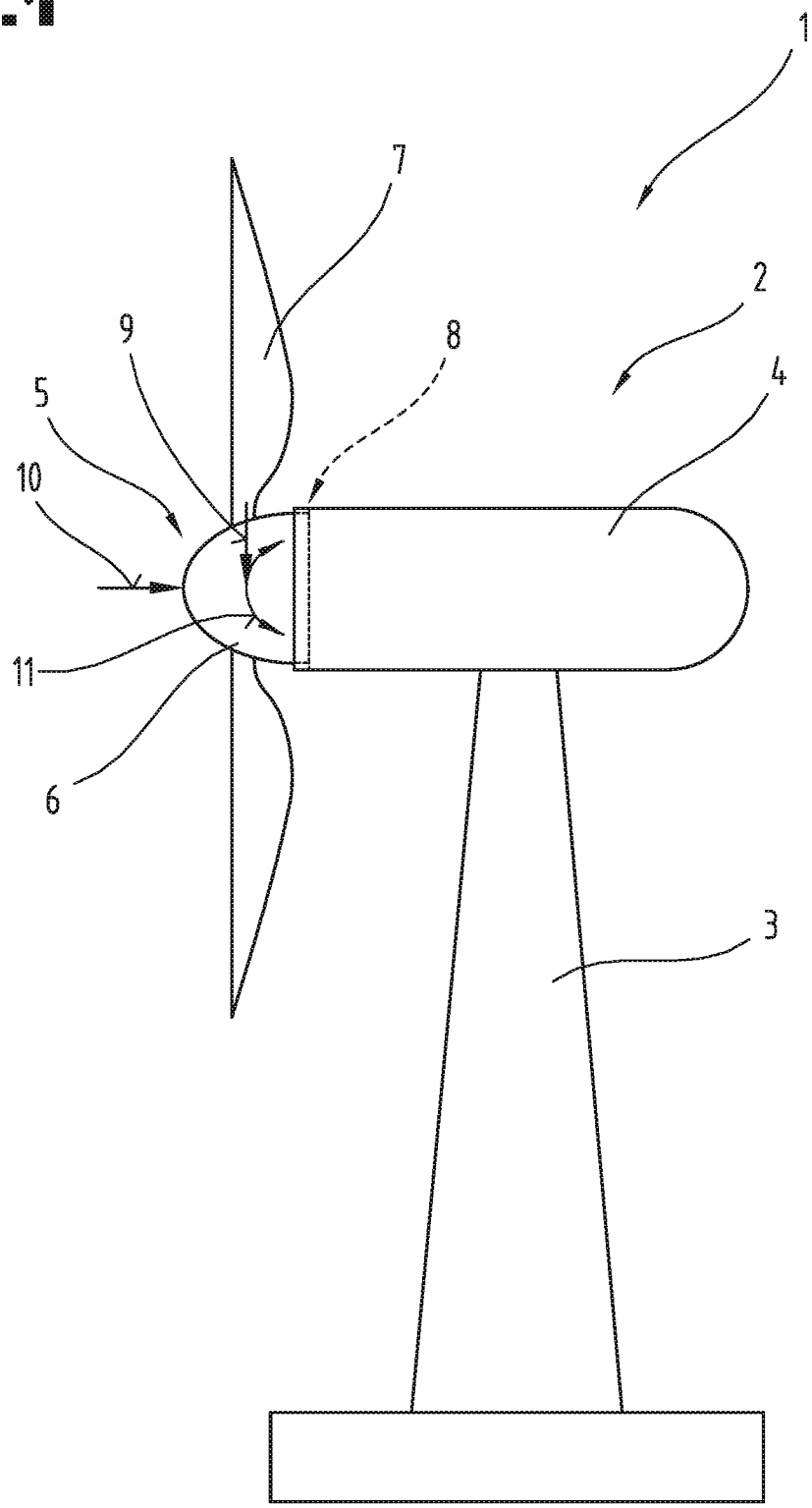
FIG. 1 a schematic representation of a wind turbine.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

Figure 2:
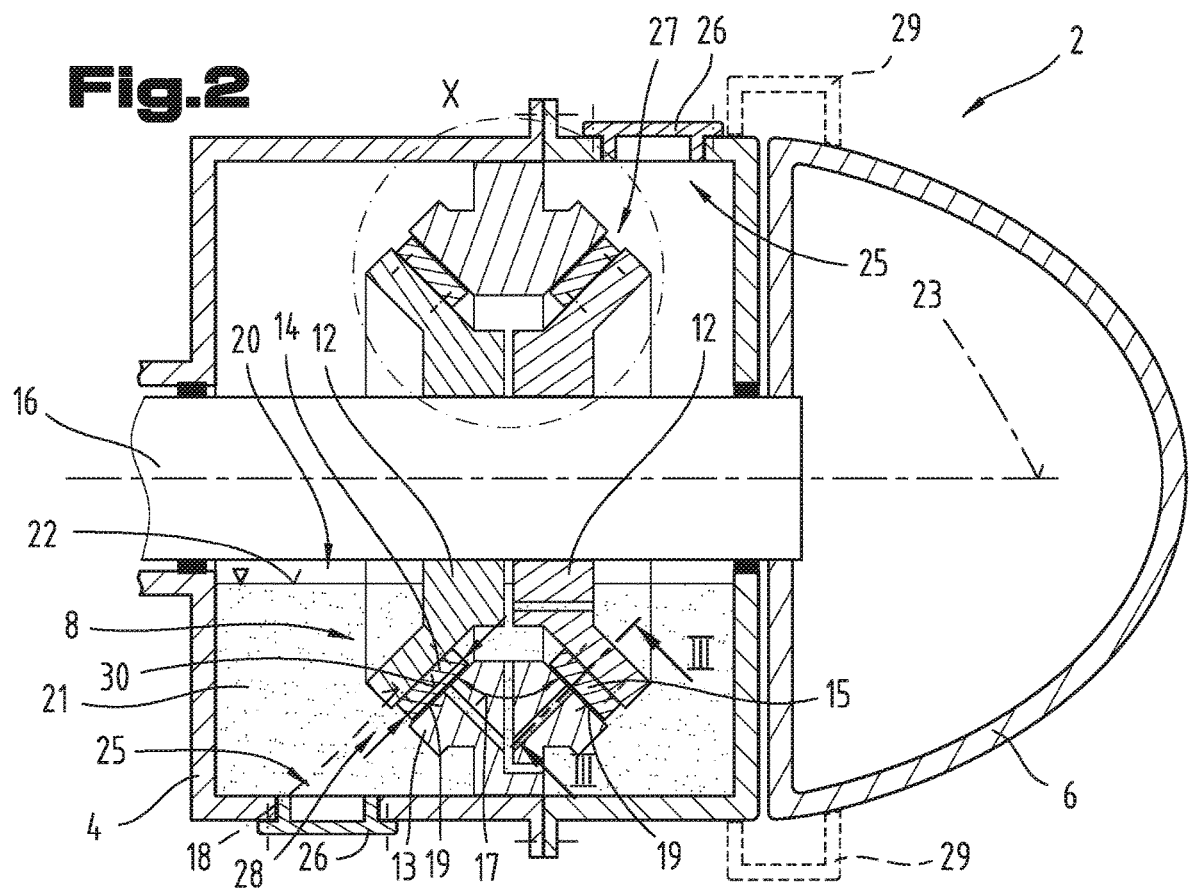
FIG. 2 a cross-section of a nacelle in a very schematic representation.

FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14, 15 is arranged between the inner ring element 12 and the outer ring element 13. In particular, it may be provided that a first sliding bearing element 14 and a second sliding bearing element 15 is arranged between the inner ring element 12 and the outer ring element 13.

As can be seen from FIG. 2, it may be provided that the inner ring element 12 is coupled with the rotor hub 6. In particular, it may be provided that a rotor shaft 16 is formed, on which the rotor hub 6 is arranged. The inner ring element 12 can be received directly on the rotor shaft 16.

In a further exemplary embodiment that is not depicted, it may of course also be provided that the inner ring element 12 is received directly on the rotor hub 6.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14, 15 are each formed so as to be spaced apart from each other on the V-shaped flank between the two ring elements 12, 13.

In particular, it may be provided that the two sliding bearing elements 14, 15 are arranged at an angle 17 to one another. As can be seen from FIG. 2, an exemplary embodiment may provide that the sliding bearing elements 14 are fastened to the inner ring element 12 by means of a fastening means 18. Hence, a sliding surface 19 may be formed between the sliding bearing elements 14, 15 and the outer ring element 13. In an arrangement of the sliding bearing elements 14, 15 as it is shown in FIG. 2, the sliding surfaces 19 may also be arranged in a V-shape.

In an embodiment variant that is not depicted, it may also be provided that the sliding bearing element 14, 15 are formed between the two ring elements 12, 13 as a radial bearing and/or as an axial bearing.

As can also be seen from FIG. 2, it may be provided that the inner ring element 12 is designed to be parted with regard to its axial extension, in order to make the assembly of the rotor bearing 8 easier.

In an exemplary embodiment that is not depicted, it is of course also conceivable that the inner ring element 12 does not form a groove as shown in the exemplary embodiment of FIG. 2, but rather that the V-shaped arrangement has a reverse formation, so that a V-shaped projection is formed on the inner ring element 12. In this case, it may be provided for the purpose of an easier assembly that the outer ring element 13 is designed to be parted in its axial extension.

As can further be seen from FIG. 2, it may be provided that a lubricating oil sump 20 is formed, which serves for receiving lubricating oil 21. In the operating state, the lubricating oil sump 20 can be filled with lubricating oil 21 up to a lubricating oil level 22. In this regard, the lubricating oil level 22 is selected such that the sliding surfaces 19 are at least partially below the lubricating oil level 22 and thus are immersed in the lubricating oil 21 situated in the lubricating oil sump 20.

For changing the sliding bearing elements 14, 15, it may be provided that the lubricating oil 21 situated in the lubricating oil sump 20 is discharged.

In particular, it may be provided that the sliding bearing elements 14, 15 are arranged about a rotor axis 23.

Figure 3:
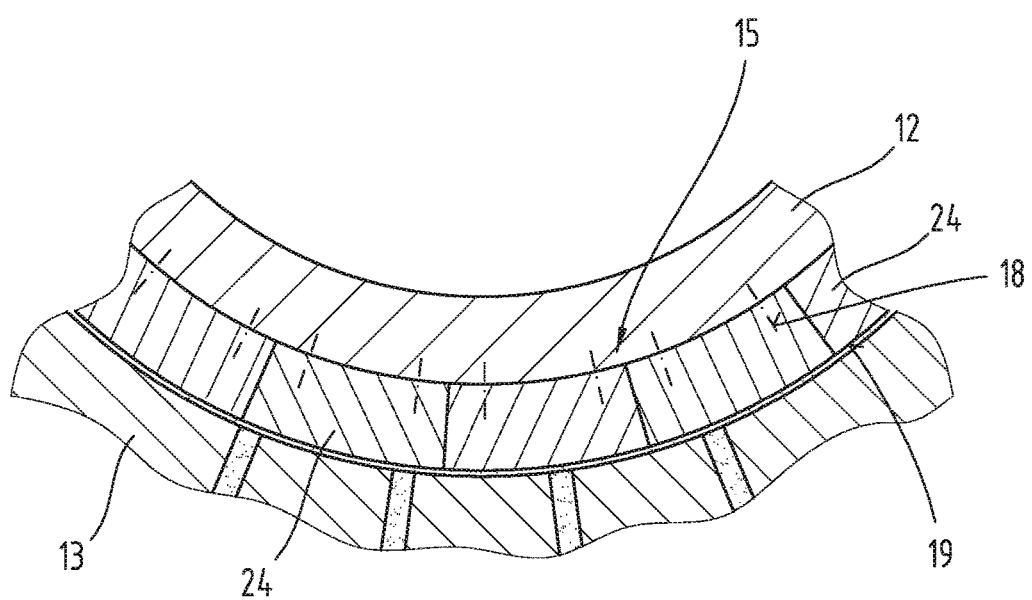
FIG. 3 a sectional view according to section line III-III in FIG. 2.

FIG. 3 shows a sectional view according to section line III-III in FIG. 2.

As can be seen from FIG. 3, it is provided that the sliding bearing element 14, 15 has multiple sliding bearing pads 24, which are arranged so as to be distributed across the circumference. The individual sliding bearing pads 24 can be coupled with and/or fastened on the inner ring element 12 by means of the fastening means 18. In particular, it may be provided that the individual sliding bearing pads 24 are independently releasable from the inner ring element 12 by means of the fastening means 18. Thereby, the individual sliding bearing pads 24 can be removed from their operating position and/or be replaced individually and independently of each other.

As can further be seen from FIG. 2, it may be provided that a sliding bearing pad changing opening 25 is formed in the nacelle housing 4, through which sliding bearing pad changing opening 25 the individual sliding bearing pads 24 can be removed from the nacelle housing 4 without having to disassemble the nacelle housing 4. Of course, it may also be provided that multiple sliding bearing pad changing openings 25 are provided in the nacelle housing 4.

In a further exemplary embodiment, it may also be provided that the sliding bearing pad changing openings 25 are also located in the rotor hub 6.

The sliding bearing pad changing openings 25 can be closed by means of a lid 26, which can be removed from the nacelle housing 4 for changing the individual sliding bearing pads 24.

As can further be seen from FIG. 2, it may be provided that one of the sliding bearing pad changing openings 25 is arranged in the region of a topmost position 27 of the second sliding bearing element 15 and that one further of the sliding bearing pad changing openings 25 is arranged at a bottommost position 28 of the first sliding bearing element 14. Therefore, it may be provided that the individual sliding bearing pads 24 of the second sliding bearing element 15 are changed at the topmost position 27 of the second sliding bearing element 15. Moreover, it may be provided that the sliding bearing pads 24 of the first sliding bearing element 14 are changed at the bottommost position 28 of the first sliding bearing element 14.

Moreover, it may be provided that a receiving device 29 is formed, by means of which the rotor hub 6 can be fastened to the nacelle housing 4 in order to be able to relieve the individual sliding bearing elements 14, 15 for changing the sliding bearing pads 24.

Figure 4:
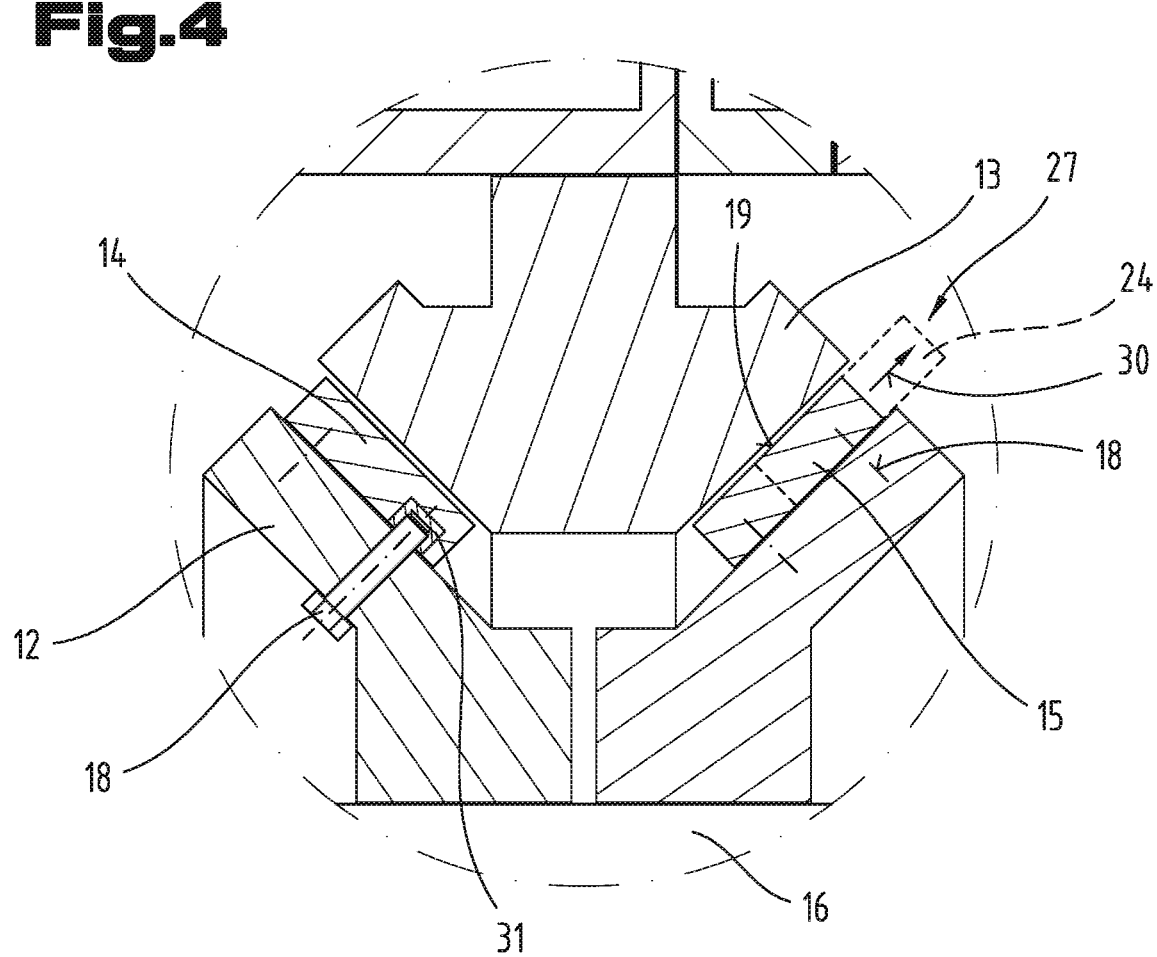
FIG. 4 a detail view of the detail x of FIG. 2.

FIG. 4 shows a detail view of the detail x of FIG. 2.

A changing operation for changing the individual sliding bearing pads 24 is described by a combination of FIGS. 2 to 4.

In a first method step, it may be provided that lubricating oil 21 possibly situated in a lubricating oil sump 20 is discharged from the same. Subsequently, the lids 26 can be taken off of the nacelle housing 4 to uncover the sliding bearing pad changing openings 25. Hence, it may be achieved that the individual sliding bearing pads 24 can be taken out of the interior of the nacelle housing 4 through the sliding bearing pad changing opening 25 and be replaced by new sliding bearing pads 24.

In a further method step, it may be provided that the rotor 5 is rotated relative to the nacelle housing 4, such that a first one of the sliding bearing pads 24 to be changed of the second sliding bearing element 15 is situated in a topmost position 27. Due to the tilting torque 11 acting on the rotor hub 6, that sliding bearing pad 24 of the second sliding bearing element 15, which is situated in the topmost position 27, is unloaded and therefore not clamped between the inner ring element 12 and the outer ring element 13. In particular, it may be provided that the sliding surface 19 of the sliding bearing pad 24 of the second sliding bearing element 15 in the topmost position 27 does not contact the outer ring element 13.

In a further method step, those fastening means 18, which fasten said sliding bearing pad 24 to the inner ring element 12, can be released, so that the sliding bearing pad 24 is loosely received between the inner ring element 12 and the outer ring element 13 and, in a subsequent method step, can be pulled out of its position in the changing direction 30. Here, the sliding bearing pad 24 can be taken out of the interior of the nacelle housing 4 through the sliding bearing pad changing opening 25 and subsequently be disposed of and/or recycled accordingly.

In a subsequent method step, a new and unworn sliding bearing pad 24 can be inserted at the position of the removed sliding bearing pad 24 and subsequently be fastened on the inner ring element 12 by means of fastening means 18. Subsequently, the rotor 5 can be rotated about the rotor axis 23 together with the inner ring element 12, so that a further one of the sliding bearing pads 24 of the second sliding bearing element 15 arrives at the topmost position 27.

Subsequently, this sliding bearing pad 24 can be exchanged for a new sliding bearing pad 24, analogously to the previously described method.

Subsequently, the rotor 5 can be rotated further in order to be able to change another sliding bearing pad 24. These method steps may be repeated until all of the sliding bearing pads 24 of the second sliding bearing element 15 are changed.

Analogously thereto, the individual sliding bearing pads 24 of the first sliding bearing element 14 can be changed in its bottommost position 28.

For changing the individual sliding bearing pads 24, it may be provided that in a first exemplary method, all sliding bearing pads 24 of the first sliding bearing element 14 are changed and subsequently, all sliding bearing pads 24 of the second sliding bearing element 15 are changed. Of course, it is also conceivable that in a first method step, all sliding bearing pads 24 of the second sliding bearing element 15 are changed and subsequently, all sliding bearing pads 24 of the first sliding bearing element 14 are changed. In yet another exemplary method, it is also possible that the sliding bearing pads 24 of the first sliding bearing element 14 and the sliding bearing pads 24 of the second sliding bearing element 15 are changed in alternation in order to keep the rotation of the rotor hub 6 necessary for the changing operation as low as possible.

Changing the individual sliding bearing pads 24 may take place with the aid of the receiving device 29.

As can further be seen from FIG. 4, it may be provided that fastening inserts 31, in particular threaded inserts, are received in the individual sliding bearing pads 24.

In case of a different structure of the rotor bearing 8 and/or of the nacelle 2, it is of course also conceivable that the individual sliding bearing pads 24 are changed by means of a different method and/or in a different sequence.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 wind turbine
2 nacelle
3 tower
4 nacelle housing
5 rotor
6 rotor hub 7 rotor blade
8 rotor bearing
9 radial force
10 axial force
11 tilting torque
12 inner ring element
13 outer ring element
14 first sliding bearing element
15 second sliding bearing element
16 rotor shaft
17 angle
18 fastening means
19 sliding surface
20 lubricating oil sump
21 lubricating oil
22 lubricating oil level
23 rotor axis
24 sliding bearing pad
25 sliding bearing pad changing opening
26 lid
27 topmost position
28 bottommost position
29 receiving device
30 changing direction
31 fastening insert

The invention claimed is:

1. A method for changing a sliding bearing element of a rotor bearing of a wind turbine, the method comprising:
providing the rotor bearing, wherein the rotor bearing comprises an inner ring element and an outer ring element, between which the sliding bearing element is arranged, wherein the inner ring element and the outer ring element are rotatable relative to each other, wherein a rotor hub is fastened to the inner ring element or to the outer ring element, wherein the sliding bearing element comprises multiple individual sliding bearing pads, each of which are releasably fastened to the inner ring element or outer ring element of the rotor bearing by means of at least one fastening means;
removing, during the changing of the sliding bearing element, the individual sliding bearing pads one after the other and replacing the individual sliding bearing pads by new sliding bearing pads without disassembling, during the changing of the individual sliding bearing pads of the sliding bearing element, the inner ring element and the outer ring element,
wherein in the course of the changing operation, all of the individual sliding bearing pads are changed, wherein for changing the individual sliding bearing pads, in each case, a sliding bearing pad to be changed is moved into a sliding bearing pad changing position, in which it is not loaded, and
wherein both the inner ring element and the outer ring element are designed to be V-shaped, and a first sliding bearing element and a second sliding bearing element, each having multiple individual sliding bearing pads, are arranged between the two ring elements so as to be axially spaced apart from each other, wherein the two sliding bearing elements are arranged at an angle to one another when viewed in the cross-section, wherein due to a tilting torque acting on the rotor hub, one of the two sliding bearing elements is not loaded at its topmost position and the second of the two sliding bearing elements is not loaded at its bottommost position, which results in the sliding bearing pad changing positions.

2. The method according to claim 1, wherein the rotor hub is fastened to the inner ring element and wherein the sliding bearing pads of the sliding bearing elements are fastened to the inner ring element and wherein the first sliding bearing element, which is farther away from the rotor hub, is not loaded at its bottommost position and wherein the second sliding bearing element, which is closer to the rotor hub, is not loaded at its topmost position and wherein by rotating the rotor hub, the individual sliding bearing pads of the sliding bearing elements can be moved into the sliding bearing pad changing position.

3. The method according to claim 1, wherein at any point in time during the changing of the sliding bearing element, at least one of the sliding bearing pads remains in the rotor bearing.

4. The method according to claim 1, wherein the method comprises the following method steps:
rotating the rotor hub relative to a nacelle housing of the nacelle until one of the sliding bearing pads arrives at a sliding bearing pad changing position at which it is not loaded;
removing that sliding bearing pad which is situated at the sliding bearing pad changing position and inserting a new sliding bearing pad in place of the removed sliding bearing pad;
rotating the rotor hub relative to the nacelle housing of the nacelle until a further one of the sliding bearing pads arrives at the sliding bearing pad changing position;
removing that sliding bearing pad which is situated at the sliding bearing pad changing position and inserting a new sliding bearing pad in place of the removed sliding bearing pad;
performing the above method steps until all of the old sliding bearing pads are replaced by new sliding bearing pads.

5. The method according to claim 1, wherein while being changed, the sliding bearing pads are moved in a changing direction in parallel to their sliding surface.

6. A nacelle for a wind turbine, the nacelle comprising:
a nacelle housing;
a rotor hub;
a rotor bearing for bearing the rotor hub on the nacelle housing, wherein the rotor bearing has at least one inner ring element and at least one outer ring element, wherein at least one sliding bearing element is formed between the inner ring element and the outer ring element;
wherein the sliding bearing element comprises multiple individual sliding bearing pads, which are arranged so as to be distributed across the circumference, and wherein the sliding bearing pads are each arranged, by means of at least one fastening means, to that ring element, which is designed to be rotatable relative to the nacelle housing;
wherein the nacelle is configured so that in the course of the changing operation, all of the individual sliding bearing pads are changed, wherein for changing the individual sliding bearing pads, in each case, a sliding bearing pad to be changed is moved into a sliding bearing pad changing position, in which it is not loaded, and
wherein both the inner ring element and the outer ring element are designed to be V-shaped, and a first sliding bearing element and a second sliding bearing element, each having multiple individual sliding bearing pads, are arranged between the two ring elements so as to be axially spaced apart from each other, wherein the two sliding bearing elements are arranged at an angle to one another when viewed in the cross-section, wherein due to a tilting torque acting on the rotor hub, one of the two sliding bearing elements is not loaded at its topmost position and the second of the two sliding bearing elements is not loaded at its bottommost position, which results in the sliding bearing pad changing positions.

7. The nacelle according to claim 6, wherein a sliding bearing pad changing opening, through which the sliding bearing pads can be guided, is arranged in the nacelle housing.

8. A method for changing a sliding bearing element of a rotor bearing of a wind turbine, the method comprising:
    providing the rotor bearing, wherein the rotor bearing comprises an inner ring element and an outer ring element, between which the sliding bearing element is arranged, wherein the inner ring element and the outer ring element are rotatable relative to each other, wherein a rotor hub is fastened to the inner ring element or to the outer ring element, wherein the sliding bearing element comprises multiple individual sliding bearing pads, each of which are releasably fastened to the inner ring element or outer ring element of the rotor bearing by means of at least one fastening means;
    removing, during the changing of the sliding bearing element, the individual sliding bearing pads one after the other and replacing the individual sliding bearing pads by new sliding bearing pads without disassembling, during the changing of the individual sliding bearing pads of the sliding bearing element, the inner ring element and the outer ring element,
    wherein the method comprises the following method steps:
    rotating the rotor hub relative to a nacelle housing of the nacelle until one of the sliding bearing pads arrives at a sliding bearing pad changing position, which is a topmost position or a bottommost position, at which it is not loaded;
    removing that sliding bearing pad which is situated at the sliding bearing pad changing position and inserting a new sliding bearing pad in place of the removed sliding bearing pad;
    rotating the rotor hub relative to the nacelle housing of the nacelle until a further one of the sliding bearing pads arrives at the sliding bearing pad changing position;
    removing that sliding bearing pad which is situated at the sliding bearing pad changing position and inserting a new sliding bearing pad in place of the removed sliding bearing pad;
    performing the above method steps until all of the old sliding bearing pads are replaced by new sliding bearing pads.

9. A method for changing a sliding bearing element of a rotor bearing of a wind turbine, the method comprising:
    providing the rotor bearing, wherein the rotor bearing comprises an inner ring element and an outer ring element, between which the sliding bearing element is arranged, wherein the inner ring element and the outer ring element are rotatable relative to each other, wherein a rotor hub is fastened to the inner ring element or to the outer ring element, wherein the sliding bearing element comprises multiple individual sliding bearing pads, each of which are releasably fastened to the inner ring element or outer ring element of the rotor bearing by means of at least one fastening means;
    removing, during the changing of the sliding bearing element, the individual sliding bearing pads one after the other and replacing the individual sliding bearing pads by new sliding bearing pads without disassembling, during the changing of the individual sliding bearing pads of the sliding bearing element, the inner ring element and the outer ring element,
    wherein the method comprises the following method steps:
    rotating the rotor hub relative to a nacelle housing of the nacelle until one of the sliding bearing pads arrives at a sliding bearing pad changing position at which it is not loaded;
    removing that sliding bearing pad which is situated at the sliding bearing pad changing position and inserting a new sliding bearing pad in place of the removed sliding bearing pad;
    rotating the rotor hub relative to the nacelle housing of the nacelle until a further one of the sliding bearing pads arrives at the sliding bearing pad changing position;
    removing that sliding bearing pad which is situated at the sliding bearing pad changing position and inserting a new sliding bearing pad in place of the removed sliding bearing pad;
    performing the above method steps until all of the old sliding bearing pads are replaced by new sliding bearing pads.

* * * * *